(12) United States Patent
Yerramalli et al.

(10) Patent No.: US 12,531,684 B2
(45) Date of Patent: Jan. 20, 2026

(54) RS CONFIGURATION AND MANAGEMENT

(71) Applicant: QUALCOMM Incorporated, San Diego, CA (US)

(72) Inventors: Srinivas Yerramalli, San Diego, CA (US); Alexandros Manolakos, Escondido, CA (US); Mukesh Kumar, Hyderabad (IN); Mohammad Tarek Fahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 18/006,937

(22) PCT Filed: Aug. 18, 2021

(86) PCT No.: PCT/US2021/046427
§ 371 (c)(1),
(2) Date: Jan. 26, 2023

(87) PCT Pub. No.: WO2022/055675
PCT Pub. Date: Mar. 17, 2022

(65) Prior Publication Data
US 2023/0179359 A1 Jun. 8, 2023

(30) Foreign Application Priority Data
Sep. 10, 2020 (IN) .............................. 202021039124

(51) Int. Cl.
*H04L 5/00* (2006.01)
*H04W 64/00* (2009.01)

(52) U.S. Cl.
CPC .......... *H04L 5/0048* (2013.01); *H04L 5/0078* (2013.01); *H04L 5/0094* (2013.01); *H04W 64/003* (2013.01)

(58) Field of Classification Search
CPC ... H04L 5/0048; H04L 5/0078; H04L 5/0082; H04L 5/0085; H04L 5/0094; H04L 5/0096; H04W 64/00; H04W 64/003
See application file for complete search history.

(56) References Cited

U.S. PATENT DOCUMENTS 11,808,871 B2 11/2023 Manolakos
2019/0246319 A1 8/2019 Lee et al.
(Continued)

FOREIGN PATENT DOCUMENTS

CN 106535319 A 3/2017
JP 2019518364 A 6/2019
(Continued)

OTHER PUBLICATIONS

International Search Report and Written Opinion—PCT/US2021/046427—ISA/EPO—Nov. 24, 2021.
(Continued)

*Primary Examiner* — Pao Sinkantarakorn
*Assistant Examiner* — Pawaris Sinkantarakorn
(74) *Attorney, Agent, or Firm* — Sunstein LLP/QUALCOMM Incorporated

(57) ABSTRACT

A method of requesting a reference signal includes sending, from a user equipment, a first on-demand reference signal (RS) request for an RS in response to a first positioning request; obtaining, at the user equipment, a first timer value indicative of a first threshold amount of time; sending, from the user equipment, a second on-demand RS request in response to either: the first threshold amount of time passing after sending the first on-demand RS request without at least one of receiving the RS at the user equipment or decoding an RS configuration message at the user equipment or receiving, at the user equipment, a second positioning request, having a higher priority than the first positioning
(Continued)

request, before passage of the first threshold amount of time after sending the first on-demand RS request.

27 Claims, 9 Drawing Sheets

(56) References Cited

U.S. PATENT DOCUMENTS

| | | | |
|---|---|---|---|
| 2020/0028648 A1 | 1/2020 | Akkarakaran et al. | |
| 2022/0132463 A1* | 4/2022 | Cha | H04B 17/27 |
| 2023/0075773 A1* | 3/2023 | Dong | H04L 5/0069 |
| 2023/0164735 A1* | 5/2023 | Si | H04L 5/0091 |
| | | | 455/456.1 |
| 2023/0345206 A1* | 10/2023 | Beale | H04W 4/029 |
| 2024/0015686 A1* | 1/2024 | Rao | H04W 64/00 |

FOREIGN PATENT DOCUMENTS

| | | |
|---|---|---|
| JP | 2019523575 A | 8/2019 |
| WO | 2020092715 | 5/2020 |
| WO | 2020146212 | 7/2020 |

OTHER PUBLICATIONS

International Search Report and Written Opinion—PCT/US2021/046427—ISA/EPO—May 3, 2022.

Qualcomm Incorporated: "Initial Thoughts on Potential Positioning Enhancements", 3GPP Draft, 3GPP TSG RAN WG1 #101-e, R1-2004492, 3rd Generation Partnership Project (3GPP), Mobile Competence Centre, 650, Route Des Lucioles, F-06921 Sophia-Antipolis Cedex, France, vol. RAN WG1, No. e-meeting, May 25, 2020-Jun. 5, 2020, May 16, 2020 (May 16, 2020), XP051886221, pp. 1-14, Sections 1-7, p. 13, Line 7-Line 27, p. 10, sections 4.1, 5.1-5.2, 6-1.

Qualcomm Incorporated: "On Demand Transmission of PRS for NR", 3GPP Draft, 3GPP TSG-RAN WG2 Meeting #105, R2-1901373_ (On Demand PRS), 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 15, 2019 (Feb. 15, 2019), XP051602732, pp. 1-15, Paragraphs [0001], [0003], pp. 1, 5-8.

CMCC: "Discussion on Potential Positioning Enhancements", R1-2006216, 3GPP TSG RAN WG1 #102-e e-Meeting, Aug. 17-28, 2020, 6 Pages.

* cited by examiner

700

| Positioning priority | Latency Constraint | Timer |
|---|---|---|
| High | 50ms | 10ms |
| Regular | 500ms | 50ms |

741 → High row
742 → Regular row
710 Positioning priority, 720 Latency Constraint, 730 Timer

| Positioning priority | Latency Constraint | Timer | FL/FR | Cell |
|---|---|---|---|---|
| High | 50ms | 10ms | FR1 | Cell1 |
| Regular | 500ms | 50ms | FR2 | Cell2 |

RS CONFIGURATION AND MANAGEMENT

CROSS-REFERENCE TO RELATED APPLICATIONS

This application claims the benefit of India Patent Application No. 202021039124, filed Sep. 10, 2020, entitled "RS CONFIGURATION AND MANAGEMENT," which is assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tons of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, a user equipment includes: a transceiver; a memory; and a processor, communicatively coupled to the transceiver and to the memory, configured to: send, via the transceiver, a first on-demand reference signal (RS) request for an RS in response to a first positioning request; obtain a first timer value indicative of a first threshold amount of time; and send, via the transceiver, a second on-demand RS request in response to either: the first threshold amount of time passing after the processor sends the first on-demand RS request without the processor at least one of receiving the RS via the transceiver or decoding an RS configuration message received via the transceiver; or receiving, by the processor, a second positioning request, having a higher priority than the first positioning request, before passage of the first threshold amount of time after the processor sends the first on-demand RS request.

In an embodiment, a user equipment includes: first sending means for sending a first on-demand reference signal (RS) request for an RS in response to a first positioning request; means for obtaining a first timer value indicative of a first threshold amount of time; receiving/decoding means for at least one of receiving the RS or decoding an RS configuration message; and second sending means for sending a second on-demand RS request in response to either: the first threshold amount of time passing after the first sending means sends the first on-demand RS request without the receiving/decoding means at least one of receiving the RS or decoding the RS configuration message; or the receiving/decoding means receiving a second positioning request, having a higher priority than the first positioning request, before passage of the first threshold amount of time after the first sending means sends the first on-demand RS request.

In an embodiment, a method of requesting a reference signal includes: sending, from a user equipment, a first on-demand reference signal (RS) request for an RS in response to a first positioning request; obtaining, at the user equipment, a first timer value indicative of a first threshold amount of time; sending, from the user equipment, a second on-demand RS request in response to either: the first threshold amount of time passing after sending the first on-demand RS request without at least one of receiving the RS at the user equipment or decoding an RS configuration message at the user equipment; or receiving, at the user equipment, a second positioning request, having a higher priority than the first positioning request, before passage of the first threshold amount of time after sending the first on-demand RS request.

In an embodiment, a non-transitory, processor-readable storage medium includes processor-readable instructions to cause a processor of a user equipment, in order to request a reference signal, to: send a first on-demand reference signal (RS) request for an RS in response to a first positioning request; obtain a first timer value indicative of a first threshold amount of time; send a second on-demand RS request in response to either: the first threshold amount of time passing after sending the first on-demand RS request without at least one of receiving the RS at the user equipment or decoding an RS configuration message at the user equipment; or receiving, at the user equipment, a second positioning request, having a higher priority than the first positioning request, before passage of the first threshold amount of time after sending the first on-demand RS request.

BRIEF DESCRIPTION OF THE DRAWINGS

FIG. 7 shows an example reference signal configuration message.

FIG. 8 shows an example initial on-demand reference signal request.

DETAILED DESCRIPTION

Figure 1:
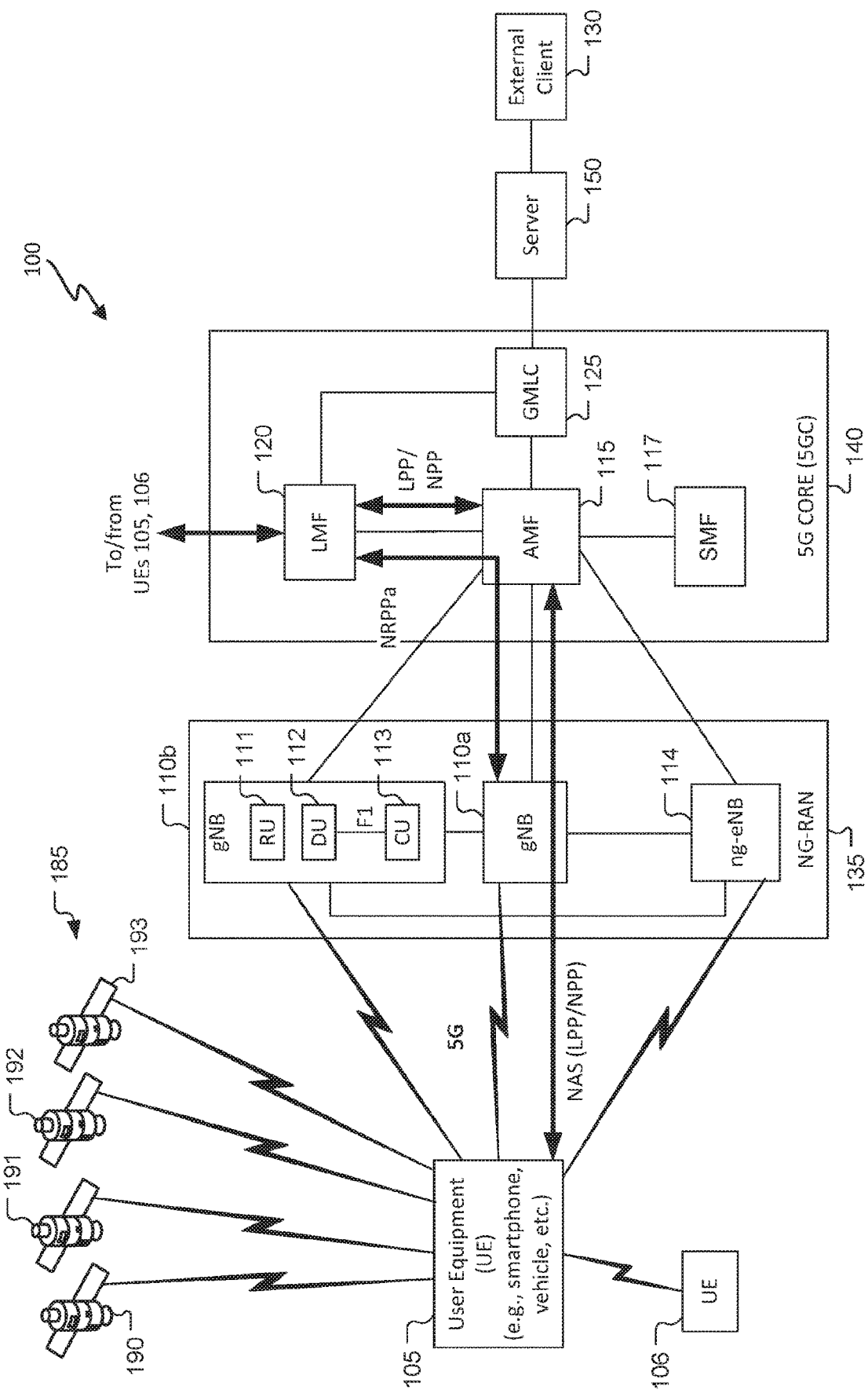
FIG. 1 is a simplified diagram of an example wireless communications system.

Techniques are discussed herein for on-demand requesting of one or more reference signals for positioning. For example, a user equipment (UE) may be triggered to obtain position information and send a request for RS (reference signal(s)) in response to being triggered. The UE may send another request for RS if the UE does not receive a valid response to the request within a threshold amount of time, e.g., based on a positioning priority (e.g., of the position information). The UE may send a request for RS in response to being triggered again for position information with a higher priority than the priority of the original triggering for position information. If a latency corresponding to a request for RS is not met, e.g., RS is (are) not received in time to determine position information satisfying a latency constraint, then a requester of the position information (e.g., an upper-layer application) may be notified. Other examples, however, may be implemented.

Items and/or techniques described herein may provide one or more of the following capabilities, as well as other capabilities not mentioned. Different priorities of demand, including changing priority of demand, for positioning information may be accommodated. Aperiodic demand for position information may be accommodated. Satisfaction of one or more latency constraints may be helped to be met, e.g., by retransmitting a reference signal request with a shorter latency time indication in response to an earlier request with a longer latency not receiving a valid response. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114 and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*a* includes an RU 111, a DU 112, and a CU 113. The RU 111, DU 112, and CU 113 divide functionality of the gNB 110*a*. While the gNB 110*a* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*a*. The DU 112 hosts the Radio Link Control (RLC), Medium Access Control (MAC), and physical layers of the gNB 110*a*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*a*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-U IRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
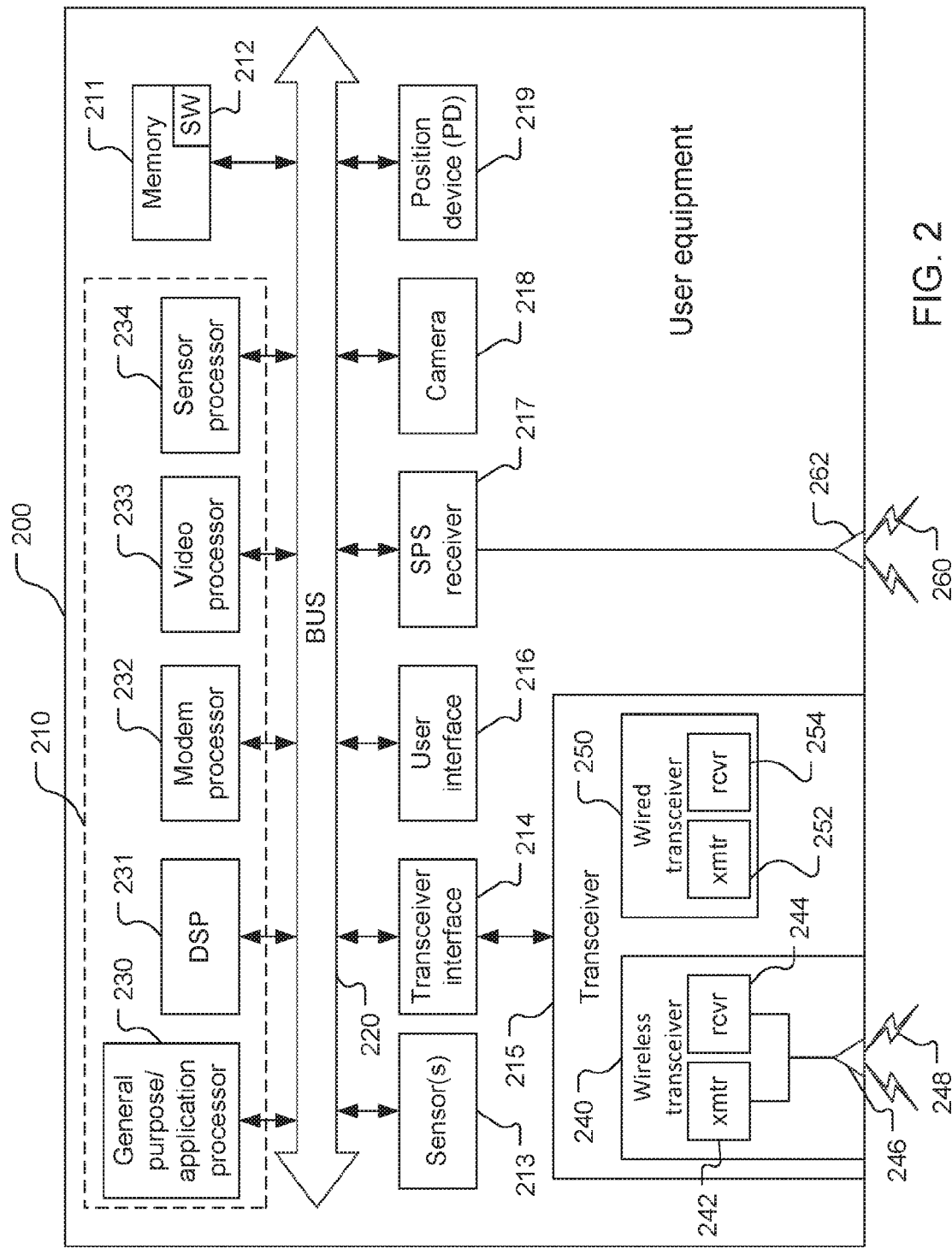
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
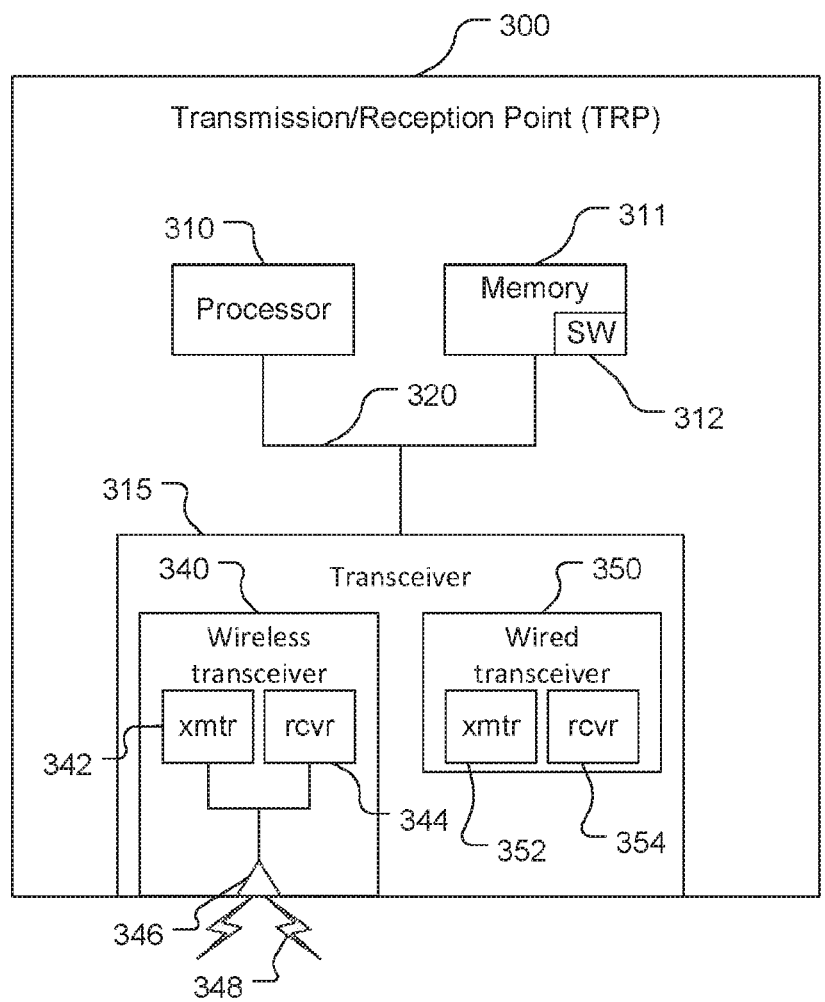
FIG. 3 is a block diagram of components of an example transmission/reception point.

Referring also to FIG. 3, an example of a TRP 300 of the gNBs 110*a*, 110*b* and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
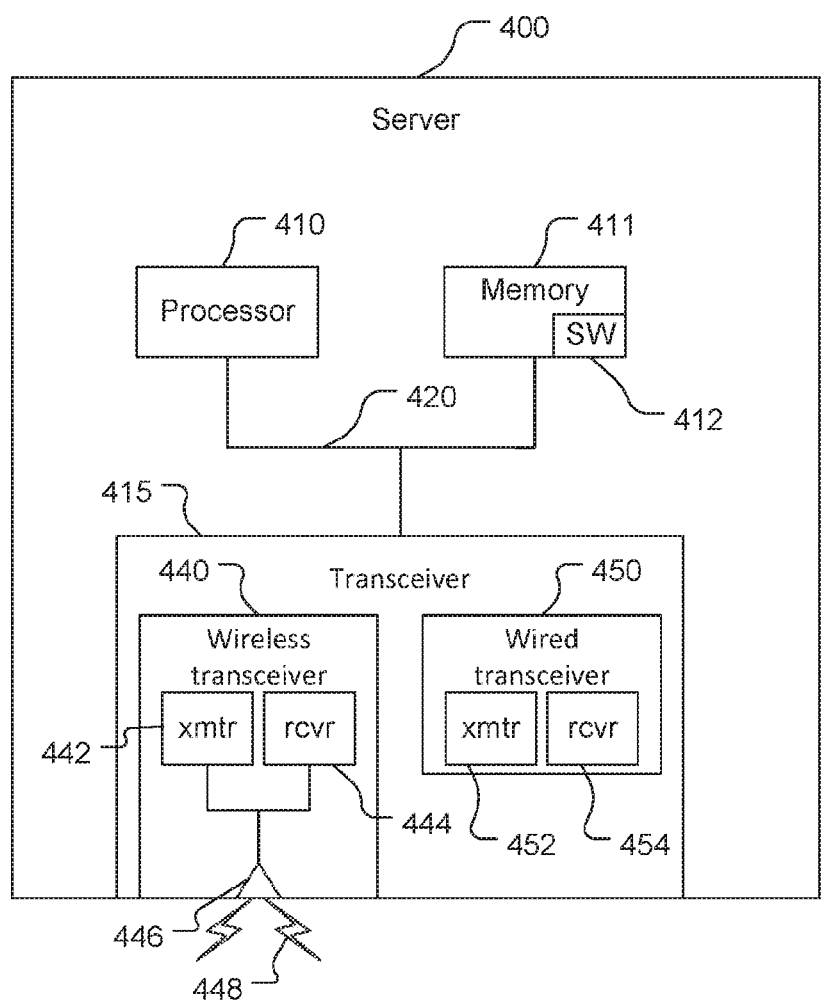
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{RX\text{-}TX}$ or $UE_{RX\text{-}TX}$) between the ToA of the RTT measurement signal and the transmission time of the RTT response message in a payload of each RTT response message. The RTT response message would include a reference signal from which the base station can deduce the ToA of the RTT response. By comparing the difference $T_{Rx \to Tx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Positioning Reference Signal Requesting

A UE may receive scheduled RS (e.g., PRS, SRS) to determine position information (e.g., one or more measurements, ranges, position estimates, etc.). The discussion herein refers to requesting PRS, but the discussion applies to other types of reference signals, including SRS for positioning. The UE may desire to obtain PRS outside of scheduled PRS, e.g., if PRS has been scheduled but is inactive, or if PRS has not been scheduled. For example, an application running on the UE and/or the TRP 300 may request the position of the UE, and the UE may respond by requesting PRS on demand. The UE may send an on-demand PRS request using, for example, a dedicated or shared UCI (Uplink Control Information) message transmitted in a PUSCH (Physical Uplink Shared CHannel) or in a PUCCH (Physical Uplink Control CHannel), or a UL MAC-CE (Uplink Medium Access Control-Control Element) message transmitted in PUSCH. The UE may request the TRP 300 to activate one or more scheduled RS resources and/or to configure one or more RS resources (e.g., PRS resources of the TRP 300 and/or SRS for positioning resources of another UE).

Figure 5:
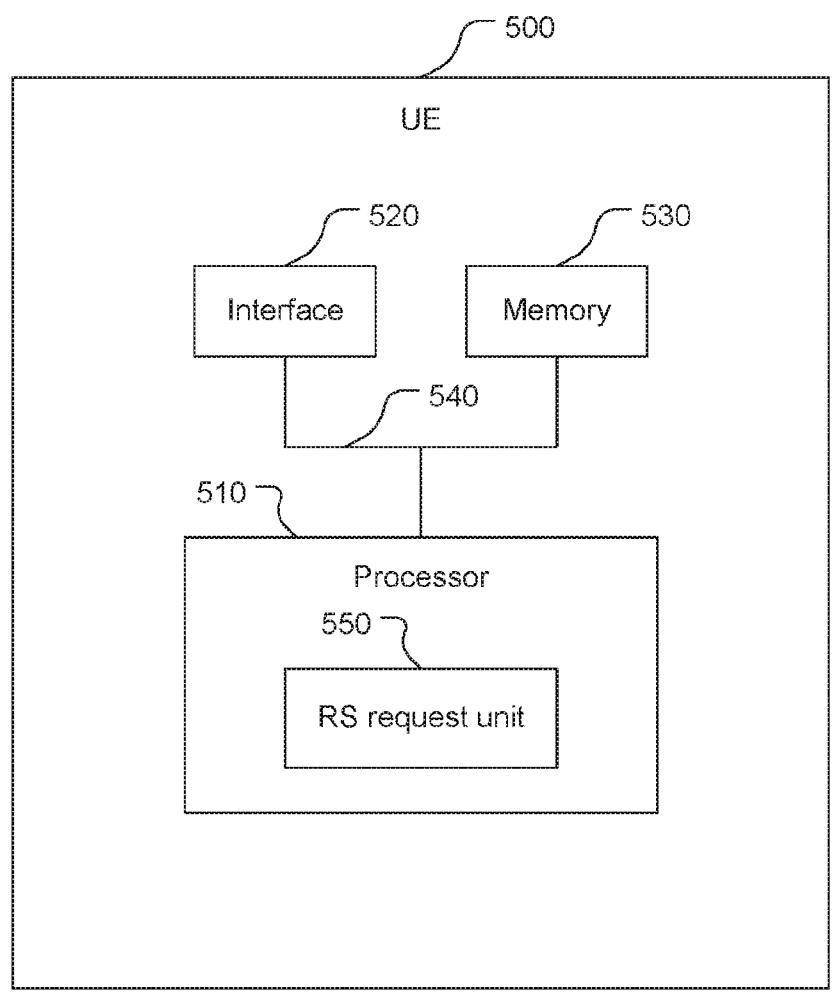
FIG. 5 is a block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include some or all of the components shown in FIG. 5, and may include one or more other components such as any of those shown in FIG. 2 such that the UE 200 may be an example of the UE 500. The processor 510 may include one or more components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the SPS antenna 262. The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes an RS request unit 550. The RS request unit 550 may be configured to send one or more requests for RS for use in determining position information for the UE 500. The configuration and functionality of the RS request unit 550 is discussed further herein, with the RS request unit 550 being configured to perform the functionality described as being performed by the RS request unit 550.

Figure 6:
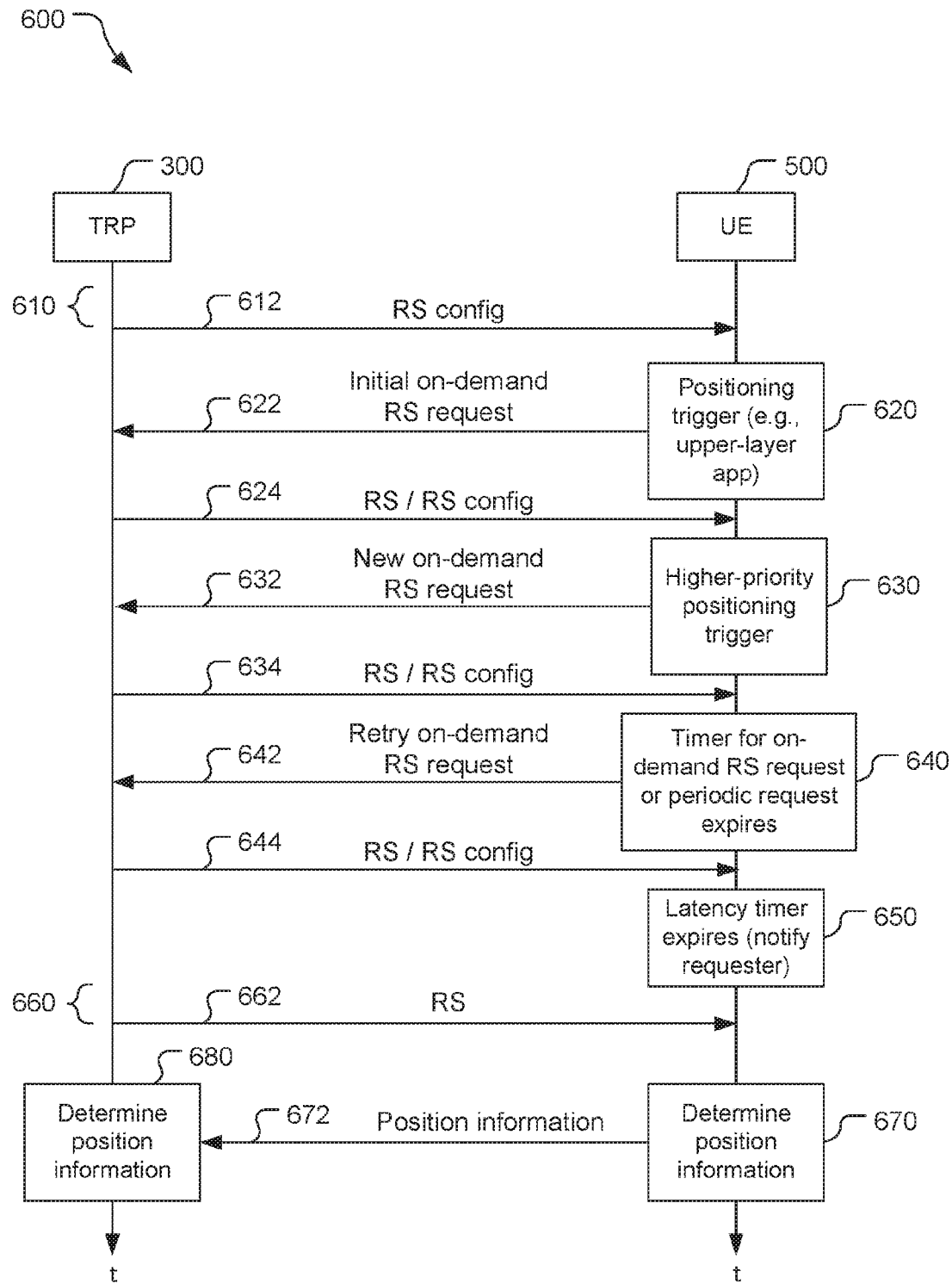
FIG. 6 is a processing and signal flow for determining position information.

Referring also to FIG. 6, a processing and signal flow 600 for determining position information includes the stages shown. The flow 600 is an example, and stages may be added to, removed from, and/or rearranged in the flow 600.

At stage 610, the TRP 300 sends an RS configuration message 612 to the UE 500. The RS configuration message 612 may indicate the resource configuration parameters for a reference signal (RS), such as a PRS or SRS for positioning, to be sent to the UE 500. The parameters may include one or more of comb number, time and/or frequency offset(s), repetition factor, activation time of previously-scheduled RS, etc. The message 612 may include one or more instructions regarding a wait time, e.g., how long the UE 500 should wait to receive a response to an on-demand RS request (from the UE 500 to the TRP 300) before the UE 500 may send another on-demand RS request. The message 612 may include a timer for the UE 500 to implement when the UE 500 sends an on-demand request for RS such that the UE 500 may send another on-demand request for the RS in response to the UE 500 not receiving a valid response (e.g., receiving the RS, decoding a DCI message instructing activation of RS resources or providing RS configuration, etc.) before the timer expires.

Timer values in the RS configuration message may depend on a positioning priority and/or a latency to be provided by the UE using PRS provided by the TRP 300. For example, a timer value may be lower (allowing quicker follow-up requesting) for higher positioning priority and/or a lower latency constraint to be provided by the UE 500. Referring also to FIG. 7, an example RS configuration message 700 includes a positioning priority field 710, a latency constraint field 720, and a timer field 730. The example RS configuration message 700 may include more or fewer fields than shown. The positioning priority field 710 includes indications of positioning priorities corresponding to timer values in the timer field 730. Similarly, the latency constraint field 720 includes indications of latencies corresponding to timer values in the timer field 730. As shown in an entry 741, a timer value of 10 ms is provided for a high positioning priority and latency constraint of 50 ms, while in an entry 742, a timer value of 50 ms is provided for a regular positioning priority and a latency constraint of 500 ms.

At stage 620, the UE 500, e.g., the RS request unit 550, receives a positioning trigger. For example, the RS request unit 550 may receive an indication from an upper-layer application that the upper-layer app wants to know position information for the UE 500, e.g., the position of the UE 500. As another example, the RS request unit 550 may receive an indication from the TRP 300 that position information (RS measurement, position estimate, etc.) regarding the UE 500 is wanted. The RS request unit 550 may respond to an indication of desired position information by sending an initial on-demand RS request 622 to the TRP 300. The request 622 may be sent as a PUCCH/UCI (Uplink Control Information) communication. The request 622 may explicitly indicate one or more specific RS parameters requested by the UE 500 and/or may indicate an implicit request for RS parameters with or without explicitly specifying one or more parameters. Thus, a request that explicitly specifies one or more RS parameters may also include an implicit RS request. An implicit RS request may, for example, indicate a positioning priority of position information being requested. For example, a high positioning priority may implicitly indicate a latency of 50 ms and a response timer value of 10 ms and a regular or low positioning priority may implicitly indicate a latency of 500 ms and a timer value of 50 ms. For example, the initial on-demand RS request 622 may indicate positioning priority level alone, or a latency constraint alone, or a combination thereof, with the corresponding timer value being implicit (e.g., known by both the UE 500 and the TRP 300). Other implicit values and/or other implicit indications may be used. Implicit values may be agreed upon, e.g., through standardization, and stored at the TRP 300 and the UE 500, or may be agreed upon through the RS configuration message 612, or in another manner. The request 622 may explicitly specify one or more of a variety of RS parameters. For example, the request 622 may specify one or more frequency layers for the RS, one or more frequency ranges of the RS (e.g., FR1 (410 MHz-7.125 GHz) or FR2 (24.25 GHz-52.6 GHz)), a timer value, and/or one or more cells for the RS (e.g., if communication between the cells has high latency). For example, referring also to FIG. 8, an example initial on-demand RS request 800 includes a positioning priority field 810, a latency constraint field 820, a timer field 830, an FL/FR field 840 (frequency layer/frequency range field), and a cell field 850. The request 800 may include more or fewer fields than shown. The FL/FR field 840 may include a frequency layer and/or a frequency range requested by the UE 500 for the RS. The cell field 850 may include a cell requested by the UE 500 for the RS. The timer field 830 includes explicit values of requested timers. The request 622 may be a physical-layer message or a MAC-layer message (e.g., a MAC-CE message). The request 622 may be transmitted on one or more primary cells that may depend on the cell(s) in which the UE 500 requests the RS to be conveyed. That is, to request RS on a specific first cell, the request 622 may need to be conveyed on a specific second cell (or one of multiple specific second cells). The RS request unit 550 may be configured to send the request 622 on a specific cell, e.g., may be configured to send the request on a cell containing a PUCCH configuration, and/or may be configured to send the request on an NR cell based on the UE 500 being connected to both LTE and NR in a non-standalone (NSA) mode. The RS request unit 550 may be configured to select to send the request 622 on one or more primary cells based on the UE 500 being configured for operation in the NSA, SA (standalone) mode or a multi-connectivity (e.g., dual-connectivity) mode. For example, the RS request unit 550 may select a primary cell for sending an RS request based on a requirement for a request to be on a primary cell of one or more particular primary cells in order for requested RS to be provided on a desired cell. As another example, the RS request unit 550 may select a primary cell for sending an RS request based on frequency ranges of primary cells and a desired frequency range for sending an RS request (e.g., based on a QoS metric value, such as a latency value, associated with the frequency range and a corresponding QoS metric value associated with the RS request, e.g., associated with a positioning session corresponding to the request).

In response to the initial on-demand RS request 622, the TRP 300 may send an RS/RS configuration message 624. The RS/RS configuration message 624 may contain RS or an RS configuration (e.g., a DCI message with one or more RS parameters (e.g., frequency offset, time offset, repetition factor, comb number, etc.), RS activation timing, etc.). Alternatively, the RS/RS configuration message 624 may comprise SRS for positioning sent by another UE. The RS/RS configuration message 624 may not be sent by any entity, e.g., due to failure of decoding of the request 622 at the TRP 300.

At stage 630, a higher-priority positioning trigger may be received by the RS request unit 550. For example, after the RS request unit 550 sends the request 622 and before the UE 500 receives RS in response to the request 622, another trigger for positioning information may be received by the RS request unit 550. The new trigger may be of equal or lower priority than the initial trigger, in which case the RS request unit 550 may respond by not sending a new request for RS. The new trigger may be of higher priority than the initial trigger. For example, the initial trigger may be for a navigation application with a low positioning priority in which case larger latencies (e.g., 1 second or more) may be acceptable, or the new trigger may be for a motion control application (e.g., robotic arm movement), with a high positioning priority in which case a latency of 50 ms or less may be used. The RS request unit 550 may be configured to respond to a new positioning trigger corresponding to a higher positioning priority than an outstanding request by sending a new on-demand RS request 632 to the TRP 300. The request 632 may be configured similarly to the request 622 but indicate a higher positioning priority than the request 622, and/or explicitly indicate a lower latency value and/or a shorter response timer value than indicated (explicitly or implicitly) by the request 622. A shorter latency value may cause the TRP 300 to act quicker and/or sooner to provide RS in order to meet the latency indicated by the UE 500 in the request 632. The new request 632 may preempt the request 622 such that the TRP 300 will act on the request 632 and disregard the request 622, or may supplement the request 622 with RS to satisfy the new request 632 without cancelling the RS to satisfy the initial request 622. Sending of the request 632 is optional and may not be performed, e.g., if no new positioning trigger is received by the RS request unit 550 before RS is received in response to the request 622, or before expiration of a timer as discussed with respect to stage 640, or at a time that makes sending the request 632 worthwhile. For example, a new, higher-positioning-priority trigger may be received by the RS request unit 550 X ms before receipt of RS is expected in response to the request 622. If the value of X is less than a latency or timer value corresponding to the new request 632, then the RS request unit 550 may not send the new request 632 as this may delay determination of position information for the UE 500.

In response to the new on-demand RS request 632, the TRP 300 may send an RS/RS configuration message 634. The RS/RS configuration message 634 may contain RS or an RS configuration (e.g., a DCI message with one or more RS parameters, RS activation timing, etc.). Alternatively, the RS/RS configuration message 634 may comprise SRS for positioning sent by another UE. The RS/RS configuration message 634 may not be sent by any entity, e.g., due to failure of decoding of the request 632 at the TRP 300.

At stage 640, the timer value corresponding to the initial on-demand RS request 622 or the new on-demand RS request 632, if sent, expires. The timer value may have been indicated in the RS configuration message 612, and/or in the initial on-demand RS request 622 (implicitly or explicitly), and/or in the new on-demand RS request 632, or otherwise known. The RS request unit 550 may be configured to determine whether a time corresponding to the timer value has passed since transmission of the corresponding RS request, e.g., the request 622 or the request 632, (e.g., expiration of a timer set to the timer value and started upon transmission of the corresponding RS request) without a valid response being received by the UE 500. A valid response could be reception of the requested RS or decoding by the UE 500 of a message (e.g., a DCI message) from the TRP 300 with RS configuration, e.g., RS parameters, timing of actuation of scheduled RS, etc. The timer may expire for a variety of reasons without the UE 500 receiving a valid response, e.g., an RS request (e.g., a PUCCH/UCI) not being decoded correctly at the TRP 300, the UE 500 not correctly decoding a DCI sent by the TRP 300 in response to an RS request by the UE 500, etc. The RS request unit 550 may be configured to respond to the time corresponding to the timer value elapsing by sending a retry on-demand RS request 642. The retry RS request 642 may be configured similarly to an earlier RS request but with a different (e.g., shorter) latency and/or timer parameter explicitly or implicitly indicated. For example, the retry request 642 may indicate a higher positioning priority for the retry RS request 642 than for the most-recent RS request (e.g., the request 622 or the request 632). Stage 640 is optional and may be omitted if a valid response is received by the UE 500 before expiration of the timer.

Also at stage 640, the RS request unit 550 may send an RS request periodically, e.g., in response to expiration of a periodic-request timer. For example, the RS request unit 550 may be configured to send an RS request to the TRP 300, start a periodic request timer in response to sending the request, send another RS request upon expiration of the periodic-request timer, reset and restart the periodic-request timer, and repeat this pattern, e.g., until instructed to stop. A periodicity of the periodic-request timer may be set to infinity to disable this feature.

Stages 630 and 640 are for scenarios warranting transmission of another RS request. The RS request may be a retransmission of an early request or may be a new request, e.g., with updated explicit or implicit latency and/or timer values. Also, more than one instance of the stage 630 and/or the stage 640 may be performed, e.g., if another higher-priority positioning trigger is received or a timer expires while there is still time to satisfy a latency constraint or (for stage 640) a periodic-request timer is used. Stage 630 and/or stage 640 may help ensure that one or more latency constraints are met. Stage 630 may help obtain RS and thus position information in the face of changing demand for position information.

In response to the retry on-demand RS request 642, the TRP 300 may send an RS/RS configuration message 644. The RS/RS configuration message 644 may contain RS or an RS configuration (e.g., a DCI message with one or more RS parameters, RS activation timing, etc.). Alternatively, the RS/RS configuration message 644 may comprise SRS for positioning sent by another UE. The RS/RS configuration message 644 may not be sent by any entity, e.g., due to failure of decoding of the request 642 at the TRP 300.

At stage 650, a latency timer may expire without the UE 500 receiving a valid response from the TRP 300. The latency timer value may have been indicated in the RS configuration message 612, and/or in the initial on-demand RS request 622 (implicitly or explicitly), and/or in the new on-demand RS request 632, and/or in the retry RS request, or otherwise known. The RS request unit 550 may be configured to determine whether a time corresponding to the timer value has passed since transmission of the corresponding RS request, e.g., the request 622 or the request 632 or the request 642, (e.g., expiration of a timer set to the timer value and started upon transmission of the corresponding RS request) without an RS response being received by the UE 500 in time to enable the UE 500 to determine position information to satisfy a latency constraint (i.e., within the latency time, e.g., before expiration of a latency timer). The RS request unit 550 may be configured to respond to the time corresponding to the timer value elapsing by sending a notification to the entity that caused the positioning trigger. For example, the RS request unit 550 may send a notification of passing of the latency time to a position-requesting protocol layer, e.g., to an upper-layer (e.g., above MAC layer) app that requested position information for the UE 500 (e.g., that caused a positioning trigger at stage 620 and/or stage 630). The notification may cause the app to take appropriate action, e.g., to provide an error indication, or to provide a delay of service indication, or to re-send a positioning trigger, etc. Stage 650 is optional and may be omitted if RS is(are) received by the UE 500 in time to meet the latency constraint. Stage 650 may be performed if the latency timer expires corresponding to one RS request and may be omitted based on receipt of RS within a time to satisfy a latency constraint for another RS request.

At stage 660, the TRP 300 (or another UE) sends one or more RS 662 to the UE 500. The TRP 300 (or another UE) sends RS based on the RS configuration message 612 and/or one or more of the RS/RS configuration messages 624, 634, 644. The RS 662 may not be sent if the RS have previously been sent in one or more of the RS/RS configuration messages 624, 634, 644.

At stage 670, the UE 500 determines position information based on received RS. For example, the UE 500 may measure PRS from the TRP 300 and/or SRS for positioning from another UE 500 to determine measurement information (e.g., RSRP, ToA, SINR, a position estimate, etc.). The UE 500 may send some or all of the determined position information to the TRP 300 in a position information message 672. The processor 510 may send position information in a MAC-CE message if the processor 510 determines that the MAC-CE message has available payload capacity, e.g., the MAC-CE message could be filled with padding bits, e.g., in order to meet a length requirement for the MAC-CE message, and that the amount of padding bits is equal to or larger than the number of bits of the position information. Also or alternatively, the processor 510 may send information regarding status of a positioning request in the MAC-CE message. For example, the processor 510 may send position request status in the MAC-CE message if position information is not available (e.g., determined) yet. The position request status may be sent in the MAC-CE message at stage 670, or elsewhere in the flow 600.

At stage 680, the TRP 300 may determine position information. The TRP 300 may, for example, determine a range and/or a position estimate of the UE 500 based on the position information message 672, and possibly based on one or more other messages with other position information (e.g., measurement information). Also or alternatively, another network entity such as the server 400 (e.g., an LMF) may determine position information based on information provided by the TRP 300 and/or one or more other entities such as the UE 500.

Figure 9:
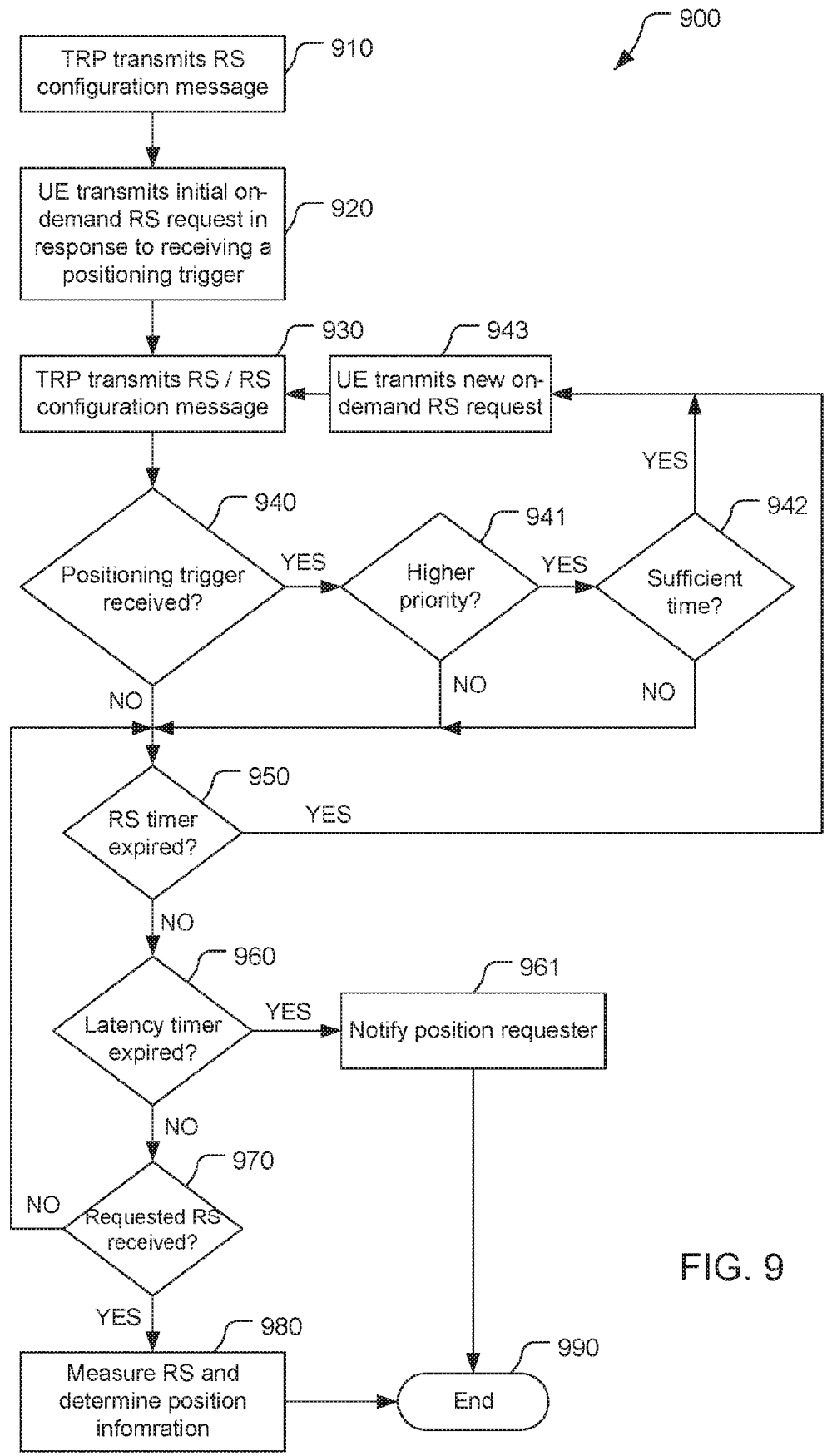
FIG. 9 shows a method for determining position information.

Referring also to FIG. 9, a method 900 for determining position information includes the stages shown and represents an algorithm for determining position information. The method 900 is, however, an example only and not limiting. The method 900 may be altered, e.g., by having stages added, removed, rearranged, combined, performed concurrently, and/or having single stages split into multiple stages.

At stages 910, 920, 930, the TRP 300 and UE 500 exchange messages to obtain RS and/or one or more RS configurations. For example, at stage 910, the TRP 300 transmits the RS configuration message 612 to the UE 500. As another example, at stage 920, the UE 500 transmits the initial on-demand RS request 622 in response to receiving a positioning trigger, e.g., from an upper-layer app. As another example, at stage 930, the TRP 300 transmits the RS/RS configuration message 624 to the UE 500.

At stage 940, an inquiry is made as to whether a positioning trigger has been received by the UE 500. If the UE 500 has received a new positioning trigger, then the method 900 proceeds to stage 941 where an inquiry is made by the processor 510 as to whether the new positioning trigger has a higher priority than the previous positioning trigger received at stage 920. If the new positioning trigger is not of a higher priority, then the method 900 proceeds to stage 950. If the new positioning is of a higher priority than the previous positioning trigger, then the method 900 proceeds to stage 942 where the processor 510 inquires as to whether there is sufficient time to satisfy a new positioning request corresponding to the new positioning trigger, e.g., whether there is sufficient time to request PRS, receive the requested PRS, and process the PRS within a time constraint for the positioning request. If there is insufficient time to satisfy the new positioning request, then the method 900 proceeds to stage 950. If there is sufficient time, then the method 900 proceeds to stage 943. At stage 943, the UE 500 transmits a new on-demand RS request, e.g., the new on-demand RS request 632 to the TRP 300. The method 900 then returns to stage 930.

At stage 950, the processor 510 inquires as to whether an RS timer has expired. If the RS timer, e.g., limiting an amount of time that the UE 500 will wait for a requested RS before re-requesting the RS, has expired, then the method 900 proceeds to stage 943 to transmit a new on-demand RS request (e.g., the retry on-demand RS request 642) to the TRP 300. If the timer has not expired, then the method 900 proceeds to stage 960.

At stage 960, the processor 510 inquires as to whether a latency timer has expired. If the latency timer has expired, then the method 900 proceeds to stage 961 where the processor 510 notifies the position requester as discussed with respect to stage 650, and the method 900 ends at stage 990. If the latency timer has not expired, then the method 900 proceeds to stage 970.

At stage 960, the processor 510 inquires as to whether the requested RS has been received. If the requested RS has not been received, then the method 900 returns to stage 950. If the requested RS has been received (e.g., at stage 660), then the method 900 proceeds to stage 980 where the processor measures the RS and determines position information, e.g., as discussed with respect to stage 670. The method 900 then ends at stage 990.

Figure 10:
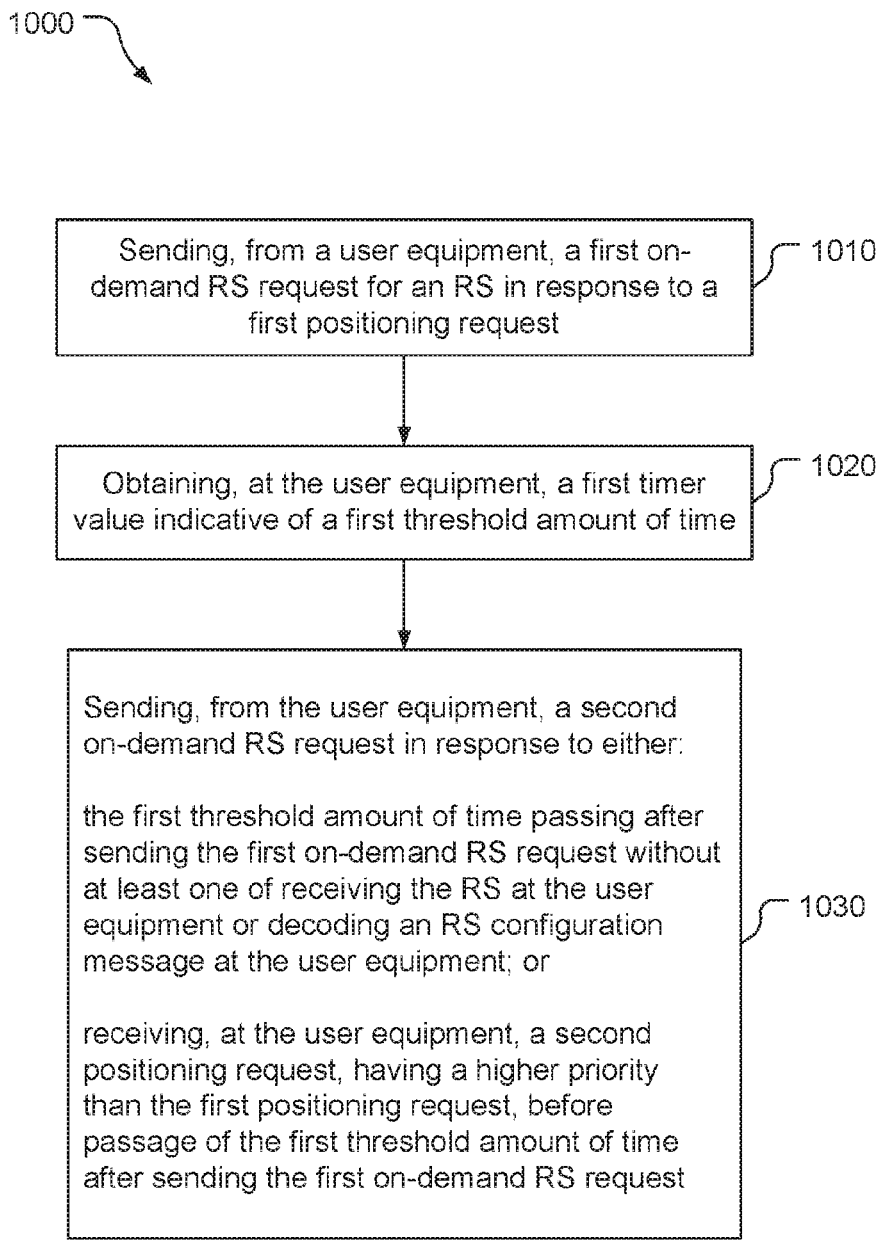
FIG. 10 is a block flow diagram of a method of requesting a reference signal.

Referring to FIG. 10, with further reference to FIGS. 1-9, a method 1000 of requesting one or more reference signals and determining position information includes the stages shown. The method 1000 is, however, an example only and not limiting. The method 1000 may be altered, e.g., by having stages added, removed, rearranged, combined, performed concurrently, and/or having single stages split into multiple stages.

At stage 1010, the method 1000 includes sending, from a user equipment, a first on-demand reference signal (RS) request for an RS in response to a first positioning request.

For example, as with stage 620, the RS request unit 550 may send the initial on-demand RS request 622 to the TRP 300 in response to a positioning trigger received at stage 620, e.g., from an upper-protocol layer in the UE 500 or from the TRP 300. The processor 510, possibly in combination with the memory 530, in combination with the interface 520 (e.g., the wireless transmitter 242 and the antenna 246) may comprise means for sending a first on-demand RS request.

At stage 1020, the method 1000 includes obtaining, at the user equipment, a first timer value indicative of a first threshold amount of time. For example, the RS request unit 550 may receive a time value in the RS configuration message 612 or retrieve a timer value from the memory 530 based on a positioning trigger received at stage 620, e.g., based on a corresponding positioning priority (e.g., of a use of position information being requested, e.g., corresponding to an application requesting the position information). The processor 510, possibly in combination with the memory 530, possibly in combination with the interface 520 (e.g., the wireless receiver 244 and the antenna 246) may comprise means for obtaining the first timer value.

At stage 1030, the method 1000 includes sending, from the user equipment, a second on-demand RS request in response to either: the first threshold amount of time passing after sending the first on-demand RS request without at least one of receiving the RS at the user equipment or decoding an RS configuration message at the user equipment; or receiving, at the user equipment, a second positioning request, having a higher priority than the first positioning request, before passage of the first threshold amount of time after sending the first on-demand RS request. For example, the RS request unit 550 may send the new on-demand RS request 632 in response to a higher-priority positioning trigger being received, e.g., from the TRP 300 or from an upper-layer protocol (e.g., an application) in the UE 500. Also or alternatively, the RS request unit may send the retry on-demand RS request 642 based on a response timer expiring with the UE 500 receiving requested RS or decoding a message from the TRP 300 with RS configuration information. The processor 510, possibly in combination with the memory 530, in combination with the interface 520 (e.g., the wireless transmitter 242 and the antenna 246) may comprise means for sending a second on-demand RS request. This may help improve and/or satisfy positioning QoS by helping to ensure that PRS are provided and measured, and corresponding position information reported in a desired time. The processor 510, possibly in combination with the memory 530, possibly in combination with the interface 520 (e.g., the wireless receiver 244 and the antenna 246) may comprise receiving/decoding means for at least one of receiving the RS or decoding an RS configuration message, e.g., received from the TRP 300.

Implementations of the method 1000 may include one or more of the following features. In an example implementation, the second on-demand RS request includes an indication of at least one of a second timer value or a latency time, the second timer value indicative of a second threshold amount of time. For example, the second on-demand RS request may explicitly or implicitly have a shorter response time value than the first on-demand RS request and/or a latency value (which may be shorter than a latency value in the first on-demand RS request if any). In a further example implementation, the indication indicates a positioning priority. The indication may, for example, implicitly indicate the second timer value and/or latency time. In another further example implementation, the indication indicates the second timer value, and the second on-demand RS request is sent only if the second threshold amount of time will be reached after sending the second on-demand RS request before the first threshold amount of time will be reached after sending the first on-demand RS request. For example, the RS request unit 550 may be configured to send the new on-demand RS request (corresponding to higher priority positioning than the initial on-demand RS request) only if the timer for the initial on-demand RS request will expire after a timer for the new on-demand RS request, e.g., only if the RS will be received sooner for the new request than for the original request. This may help ensure that a higher-priority positioning request is met with a response no later than a response time associated with the higher-priority positioning request. Different priorities of demand, including changing priority of demand, for position information may be satisfied.

Also or alternatively, implementations of the method 1000 may include one or more of the following features. In an example implementation, the first on-demand RS request is sent in response to receiving a positioning request from a position-requesting protocol layer above a MAC (Medium Access Control) layer, and the method 1000 further includes sending an expiration indication to the position-requesting protocol layer in response to expiration of a latency time corresponding to the positioning request. For example, as at stage 650, the RS request unit 550 may notify an upper-layer protocol that requested the position information (e.g., an upper-layer application that caused the positioning trigger) that a latency constraint has not been met. The processor 510, possibly in combination with the memory 530, may comprise means for sending an expiration indication. In another example implementation, the first on-demand RS request consists of a single bit, and wherein the method further comprises sending an uplink MAC-CE (Medium Access Control-Control Element) message corresponding to the first on-demand RS request. For example, the first on-demand RS request may be too small to provide some information (e.g., may consist of a single bit), and the method 1000 may include sending an uplink MAC-CE (Medium Access Control-Control Element) message corresponding to the first on-demand RS request to provide supplemental information. For example, along with the initial on-demand RS request, the RS request unit 550 may send a MAC-CE message to the TRP 300 to provide further information, e.g., priority, desired latency, desired positioning accuracy, etc.). The processor 510, possibly in combination with the memory 530, in combination with the interface 520 (e.g., the wireless transmitter 242 and the antenna 246) may comprise means for sending an uplink MAC-CE message. In a further example implementation, the uplink MAC-CE message indicates at least one of a positioning priority, a positioning latency, or a positioning accuracy.

Also or alternatively, implementations of the method 1000 may include one or more of the following features. In an example implementation, the method 1000 includes: determining that a MAC-CE (Medium Access Control-Control Element) message has available payload capacity; and sending, in the MAC-CE message, at least one of a positioning request status or position information based on measurement of the RS. For example, instead of the processor 510 using padding bits in a MAC-CE message sent to the TRP 300 to fulfill a length requirement of the MAC-CE message, the processor 510 may provide position information and/or a status of a positioning request (e.g., an initial and/or subsequent request) instead of some or all of what would be padding bits. The processor 510, possibly in combination with the memory 530, may comprise means for determining that a MAC-CE message has available payload capacity. The processor 510, possibly in combination with the memory 530, in combination with the interface 520 (e.g., the wireless transmitter 242 and the antenna 246) may comprise means for sending at least one of the status of the first positioning request or position information in the MAC-CE message. In another example implementation, the method 1000 includes producing at least one of the first on-demand RS request or the second on-demand RS request to include an indication of one or more frequency layers for RS. The processor 510, possibly in combination with the memory 530, may comprise means for producing the first on-demand RS request and/or the second on-demand RS request to include an indication of one or more frequency layers. In another example implementation, the method 1000 includes selecting one or more primary cells on which to send the first on-demand RS request. In a further example implementation, the one or more primary cells are selected based on at least one of: (i) associations of first cells for receiving RS and second cells for sending RS requests; or (ii) frequency ranges associated with third cells. For example, the RS request unit 550 may select a primary cell for sending an RS request based on a requirement for a request to be on a primary cell of one or more particular primary cells in order for requested RS to be provided on a desired cell. As another example, the RS request unit 550 may select a primary cell for sending an RS request based on frequency ranges of primary cells. The processor 510, possibly in combination with the memory 530, may comprise means for selecting one or more primary cells on which to send an on-demand RS request.

Implementation Examples

Implementation examples are provided in the following numbered clauses.

Clause 1. A user equipment comprising:
a transceiver;
a memory; and
a processor, communicatively coupled to the transceiver and to the memory, configured to:
send, via the transceiver, a first on-demand reference signal (RS) request for an RS in response to a first positioning request;
obtain a first timer value indicative of a first threshold amount of time; and
send, via the transceiver, a second on-demand RS request in response to either:
the first threshold amount of time passing after the processor sends the first on-demand RS request without the processor at least one of receiving the RS via the transceiver or decoding an RS configuration message received via the transceiver; or
receiving, by the processor, a second positioning request, having a higher priority than the first positioning request, before passage of the first threshold amount of time after the processor sends the first on-demand RS request.

Clause 2. The user equipment of clause 1, wherein the processor is configured to include, in the second on-demand RS request, an indication of at least one of a second timer value or a latency time, the second timer value indicative of a second threshold amount of time.

Clause 3. The user equipment of clause 2, wherein the indication indicates a positioning priority.

Clause 4. The user equipment of clause 2, wherein the indication indicates the second timer value, and wherein the processor is configured to send the second on-demand RS request only if the second threshold amount of time will be reached after sending the second on-demand RS request before the first threshold amount of time will be reached after sending the first on-demand RS request.

Clause 5. The user equipment of clause 1, wherein the processor is configured to:
send the first on-demand RS request in response to receiving a positioning request from a position-requesting protocol layer above a MAC (Medium Access Control) layer; and
send an expiration indication to the position-requesting protocol layer in response to expiration of a latency time corresponding to the positioning request.

Clause 6. The user equipment of clause 1, wherein the first on-demand RS request consists of a single bit, and wherein the processor is configured to send an uplink MAC-CE (Medium Access Control-Control Element) message corresponding to the first on-demand RS request.

Clause 7. The user equipment of clause 6, wherein the uplink MAC-CE message indicates at least one of a positioning priority, a positioning latency, or a positioning accuracy.

Clause 8. The user equipment of clause 1, wherein the processor is configured to:
determine that a MAC-CE (Medium Access Control-Control Element) message has available payload capacity; and
send, in the MAC-CE message, at least one of a positioning request status or position information based on measurement of the RS.

Clause 9. The user equipment of clause 1, wherein the processor is configured to produce at least one of the first on-demand RS request or the second on-demand RS request to include an indication of one or more frequency layers for RS.

Clause 10. The user equipment of clause 1, wherein the processor is configured to:
implement at least one of a non-standalone mode, a standalone more, or a multi-connectivity mode; and
select one or more primary cells on which to send the first on-demand RS request.

Clause 11. The user equipment of clause 10, wherein the processor is configured to select the one or more primary cells based on at least one of: (i) associations of first cells for receiving RS and second cells for sending RS requests; or (ii) frequency ranges associated with third cells.

Clause 12. A user equipment comprising:
first sending means for sending a first on-demand reference signal (RS) request for an RS in response to a first positioning request;
means for obtaining a first timer value indicative of a first threshold amount of time;
receiving/decoding means for at least one of receiving the RS or decoding an RS configuration message; and
second sending means for sending a second on-demand RS request in response to either:
the first threshold amount of time passing after the first sending means sends the first on-demand RS request without the receiving/decoding means at least one of receiving the RS or decoding the RS configuration message; or
the receiving/decoding means receiving a second positioning request, having a higher priority than the first positioning request, before passage of the first threshold amount of time after the first sending means sends the first on-demand RS request.

Clause 13. The user equipment of clause 12, wherein the second sending means are configured to include, in the second on-demand RS request, an indication of at least one of a second timer value or a latency time, the second timer value indicative of a second threshold amount of time.

Clause 14. The user equipment of clause 13, wherein the indication indicates a positioning priority.

Clause 15. The user equipment of clause 13, wherein the indication indicates the second timer value, and wherein the second sending means comprise means for sending the second on-demand RS request only if the second threshold amount of time will be reached after sending the second on-demand RS request before the first threshold amount of time will be reached after sending the first on-demand RS request.

Clause 16. The user equipment of clause 12, wherein the first sending means comprise means for sending the first on-demand RS request in response to receiving a positioning request from a position-requesting protocol layer above a MAC (Medium Access Control) layer, the user equipment further comprising means for sending an expiration indication to the position-requesting protocol layer in response to expiration of a latency time corresponding to the positioning request.

Clause 17. The user equipment of clause 12, wherein the first on-demand RS request consists of a single bit, and wherein the user equipment further comprises means for sending an uplink MAC-CE (Medium Access Control-Control Element) message corresponding to the first on-demand RS request.

Clause 18. The user equipment of clause 17, wherein the uplink MAC-CE message indicates at least one of a positioning priority, a positioning latency, or a positioning accuracy.

Clause 19. The user equipment of clause 12, further comprising:
means for determining that a MAC-CE (Medium Access Control-Control Element) message has available payload capacity; and
means for sending, in the MAC-CE message, at least one of a positioning request status or position information based on measurement of the RS.

Clause 20. The user equipment of clause 12, further comprising means for producing at least one of the first on-demand RS request or the second on-demand RS request to include an indication of one or more frequency layers for RS.

Clause 21. The user equipment of clause 12, further comprising:
means for implementing at least one of a non-standalone mode, a standalone more, or a multi-connectivity mode; and
means for selecting one or more primary cells on which to send the first on-demand RS request.

Clause 22. The user equipment of clause 21, wherein the means for selecting are configured to select the one or more primary cells based on at least one of: (i) associations of first cells for receiving RS and second cells for sending RS requests; or (ii) frequency ranges associated with third cells.

Clause 23. A method of requesting a reference signal, the method comprising:
sending, from a user equipment, a first on-demand reference signal (RS) request for an RS in response to a first positioning request;
obtaining, at the user equipment, a first timer value indicative of a first threshold amount of time;
sending, from the user equipment, a second on-demand RS request in response to either:
the first threshold amount of time passing after sending the first on-demand RS request without at least one of receiving the RS at the user equipment or decoding an RS configuration message at the user equipment; or
receiving, at the user equipment, a second positioning request, having a higher priority than the first positioning request, before passage of the first threshold amount of time after sending the first on-demand RS request.

Clause 24. The method of clause 23, wherein the second on-demand RS request includes an indication of at least one of a second timer value or a latency time, the second timer value indicative of a second threshold amount of time.

Clause 25. The method of clause 24, wherein the indication indicates a positioning priority.

Clause 26. The method of clause 24, wherein the indication indicates the second timer value, and the second on-demand RS request is sent only if the second threshold amount of time will be reached after sending the second on-demand RS request before the first threshold amount of time will be reached after sending the first on-demand RS request.

Clause 27. The method of clause 23, wherein the first on-demand RS request is sent in response to receiving a positioning request from a position-requesting protocol layer above a MAC (Medium Access Control) layer, the method further comprising sending an expiration indication to the position-requesting protocol layer in response to expiration of a latency time corresponding to the positioning request.

Clause 28. The method of clause 23, wherein the first on-demand RS request consists of a single bit, and wherein the method further comprises sending an uplink MAC-CE (Medium Access Control-Control Element) message corresponding to the first on-demand RS request.

Clause 29. The method of clause 28, wherein the uplink MAC-CE message indicates at least one of a positioning priority, a positioning latency, or a positioning accuracy.

Clause 30. The method of clause 23, further comprising:
determining that a MAC-CE (Medium Access Control-Control Element) message has available payload capacity; and
sending, in the MAC-CE message, at least one of a positioning request status or position information based on measurement of the RS.

Clause 31. The method of clause 23, further comprising producing at least one of the first on-demand RS request or the second on-demand RS request to include an indication of one or more frequency layers for RS.

Clause 32. The method of clause 23, further comprising selecting one or more primary cells on which to send the first on-demand RS request.

Clause 33. The method of clause 32, wherein the one or more primary cells are selected based on at least one of: (i) associations of first cells for receiving RS and second cells for sending RS requests; or (ii) frequency ranges associated with third cells.

Clause 34. A non-transitory, processor-readable storage medium comprising processor-readable instructions to cause a processor of a user equipment, in order to request a reference signal, to:
send a first on-demand reference signal (RS) request for an RS in response to a first positioning request;

obtain a first timer value indicative of a first threshold amount of time;

send a second on-demand RS request in response to either:

the first threshold amount of time passing after sending the first on-demand RS request without at least one of receiving the RS at the user equipment or decoding an RS configuration message at the user equipment; or receiving, at the user equipment, a second positioning request, having a higher priority than the first positioning request, before passage of the first threshold amount of time after sending the first on-demand RS request.

Clause 35. The storage medium of clause 34, wherein the second on-demand RS request includes an indication of at least one of a second timer value or a latency time, the second timer value indicative of a second threshold amount of time.

Clause 36. The storage medium of clause 35, wherein the indication indicates a positioning priority.

Clause 37. The storage medium of clause 35, wherein the indication indicates the second timer value, and instructions configured to cause the processor to send the second on-demand RS request are configured to cause the processor to send the second on-demand RS request only if the second threshold amount of time will be reached after sending the second on-demand RS request before the first threshold amount of time will be reached after sending the first on-demand RS request.

Clause 38. The storage medium of clause 34, wherein the processor-readable instructions to cause the processor to send the first on-demand RS request comprise processor-readable instructions to cause the processor to send the first on-demand RS request in response to receiving a positioning request from a position-requesting protocol layer above a MAC (Medium Access Control) layer, and wherein the storage medium further comprises processor-readable instructions to cause the processor to send an expiration indication to the position-requesting protocol layer in response to expiration of a latency time corresponding to the positioning request.

Clause 39. The storage medium of clause 34, wherein the first on-demand RS request consists of a single bit, and wherein the storage medium further comprises processor-readable instructions to cause the processor to send an uplink MAC-CE (Medium Access Control-Control Element) message corresponding to the first on-demand RS request.

Clause 40. The storage medium of clause 39, wherein the uplink MAC-CE message indicates at least one of a positioning priority, a positioning latency, or a positioning accuracy.

Clause 41. The storage medium of clause 34, further comprising processor-readable instructions to cause the processor to:

determine that a MAC-CE (Medium Access Control-Control Element) message has available payload capacity; and send, in the MAC-CE message, at least one of a positioning request status or position information based on measurement of the RS.

Clause 42. The storage medium of clause 34, further comprising processor-readable instructions to cause the processor to produce at least one of the first on-demand RS request or the second on-demand RS request to include an indication of one or more frequency layers for RS.

Clause 43. The storage medium of clause 34, further comprising processor-readable instructions to cause the processor to select one or more primary cells on which to send the first on-demand RS request.

Clause 44. The storage medium of clause 43, wherein the processor-readable instructions to cause the processor to select the one or more primary cells comprise processor-readable instructions to cause the processor to select the one or more primary cells based on at least one of associations of first cells for receiving RS and second cells for sending RS requests, or frequency ranges associated with third cells.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment comprising:
a transceiver;
a memory; and
a processor, communicatively coupled to the transceiver and to the memory, configured to:
send, via the transceiver, a first on-demand reference signal (RS) request for an RS in response to a first positioning request; and
send, via the transceiver, a second on-demand RS request in response to receiving, by the processor, a second positioning request, having a higher priority than the first positioning request, and in response to determining that the second positioning request was received before a first threshold amount of time has passed after the processor sends the first on-demand RS request.

2. The user equipment of claim 1, wherein the processor is configured to obtain a first timer value indicative of a first threshold amount of time and to include, in the second on-demand RS request, an indication of at least one of a second timer value or a latency time, the second timer value indicative of a second threshold amount of time.

3. The user equipment of claim 2, wherein the indication indicates a positioning priority.

4. The user equipment of claim 1, wherein the processor is configured to:
send the first on-demand RS request in response to receiving the second positioning request from a position-requesting protocol layer above a MAC (Medium Access Control) layer; and
send an expiration indication to the position-requesting protocol layer in response to expiration of a latency time corresponding to the positioning request.

5. The user equipment of claim 1, wherein the first on-demand RS request consists of a single bit, and wherein the processor is configured to send an uplink MAC-CE (Medium Access Control-Control Element) message corresponding to the first on-demand RS request.

6. The user equipment of claim 5, wherein the uplink MAC-CE message indicates at least one of a positioning priority, a positioning latency, or a positioning accuracy.

7. The user equipment of claim 1, wherein the processor is configured to:
determine that a MAC-CE (Medium Access Control-Control Element) message has available payload capacity; and
send, in the MAC-CE message, at least one of a positioning request status or position information based on measurement of the RS.

8. The user equipment of claim 1, wherein the processor is configured to produce at least one of the first on-demand RS request or the second on-demand RS request to include an indication of one or more frequency layers for RS.

9. The user equipment of claim 1, wherein the processor is configured to:
implement at least one of a non-standalone mode, a standalone more, or a multi-connectivity mode; and
select one or more primary cells on which to send the first on-demand RS request.

10. The user equipment of claim 9, wherein the processor is configured to select the one or more primary cells based on at least one of: (i) associations of first cells for receiving RS and second cells for sending RS requests; or (ii) frequency ranges associated with third cells.

11. A user equipment comprising:
a transceiver;
a memory; and
a processor, communicatively coupled to the transceiver and to the memory, configured to:
send, via the transceiver, a first on-demand reference signal (RS) request for an RS in response to a first positioning request;
obtain a first timer value indicative of a first threshold amount of time; and
send, via the transceiver, a second on-demand RS request in response to receiving, by the processor, a second positioning request, having a higher priority than the first positioning request, before passage of the first threshold amount of time after the processor sends the first on-demand RS request;
wherein the processor is configured to include, in the second on-demand RS request, an indication of a second timer value indicative of a second threshold amount of time; and
wherein the processor is configured to send the second on-demand RS request only if the second threshold amount of time will be reached, after sending the second on-demand RS request, before the first threshold amount of time will be reached after sending the first on-demand RS request.

12. A user equipment comprising:
first sending means for sending a first on-demand reference signal (RS) request for an RS in response to a first positioning request;
receiving/decoding means for at least one of receiving the RS or decoding an RS configuration message; and
second sending means for sending a second on-demand RS request in response to the receiving/decoding means receiving a second positioning request, having a higher priority than the first positioning request, and in response to determining means determining that the second positioning request was received before a first threshold amount of time has passed after the first sending means sends the first on-demand RS request.

13. The user equipment of claim 12, further comprising means for obtaining a first timer value indicative of a first threshold amount of time, wherein the second sending means are configured to include, in the second on-demand RS request, an indication of at least one of a second timer value or a latency time, the second timer value indicative of a second threshold amount of time.

14. The user equipment of claim 13, wherein the indication indicates a positioning priority.

15. The user equipment of claim 12, wherein the first sending means comprise means for sending the first on-demand RS request in response to receiving the second positioning request from a position-requesting protocol layer above a MAC (Medium Access Control) layer, the user equipment further comprising means for sending an expiration indication to the position-requesting protocol layer in response to expiration of a latency time corresponding to the positioning request.

16. The user equipment of claim 12, wherein the first on-demand RS request consists of a single bit, and wherein the user equipment further comprises means for sending an uplink MAC-CE (Medium Access Control-Control Element) message corresponding to the first on-demand RS request.

17. The user equipment of claim 16, wherein the uplink MAC-CE message indicates at least one of a positioning priority, a positioning latency, or a positioning accuracy.

18. The user equipment of claim 12, further comprising:
means for determining that a MAC-CE (Medium Access Control-Control Element) message has available payload capacity; and
means for sending, in the MAC-CE message, at least one of a positioning request status or position information based on measurement of the RS.

19. The user equipment of claim 12, further comprising means for producing at least one of the first on-demand RS request or the second on-demand RS request to include an indication of one or more frequency layers for RS.

20. The user equipment of claim 12, further comprising:
means for implementing at least one of a non-standalone mode, a standalone more, or a multi-connectivity mode; and
means for selecting one or more primary cells on which to send the first on-demand RS request.

21. The user equipment of claim 20, wherein the means for selecting are configured to select the one or more primary cells based on at least one of: (i) associations of first cells for receiving RS and second cells for sending RS requests; or (ii) frequency ranges associated with third cells.

22. A user equipment comprising:
first sending means for sending a first on-demand reference signal (RS) request for an RS in response to a first positioning request;
means for obtaining a first timer value indicative of a first threshold amount of time;
receiving/decoding means for at least one of receiving the RS or decoding an RS configuration message; and
second sending means for sending a second on-demand RS request in response the receiving/decoding means receiving a second positioning request, having a higher priority than the first positioning request, before passage of the first threshold amount of time after the first sending means sends the first on-demand RS request;
wherein the second sending means are configured to include, in the second on-demand RS request, an indication of a second timer value indicative of a second threshold amount of time; and wherein the second sending means comprise means for sending the second on-demand RS request only if the second threshold amount of time will be reached, after sending the second on-demand RS request, before the first threshold amount of time will be reached after sending the first on-demand RS request.

23. A method of requesting a reference signal, the method comprising:
  sending, from a user equipment, a first on-demand reference signal (RS) request for an RS in response to a first positioning request; and
  sending, from the user equipment, a second on-demand RS request in response to receiving, at the user equipment, a second positioning request, having a higher priority than the first positioning request, and in response to determining that the second positioning request was received before a first threshold amount of time has passed after sending the first on-demand RS request.

24. The method of claim 23, further comprising obtaining, at the user equipment, a first timer value indicative of a first threshold amount of time, wherein the second on-demand RS request includes an indication of at least one of a second timer value or a latency time, the second timer value indicative of a second threshold amount of time.

25. The method of claim 24, wherein the indication indicates a positioning priority.

26. A method comprising:
  sending, from a user equipment, a first on-demand reference signal (RS) request for an RS in response to a first positioning request;
  obtaining, at the user equipment, a first timer value indicative of a first threshold amount of time;
  sending, from the user equipment, a second on-demand RS request in response receiving, at the user equipment, a second positioning request, having a higher priority than the first positioning request, before passage of the first threshold amount of time after sending the first on-demand RS request;
  wherein the second on-demand RS request includes an indication of a second timer value indicative of a second threshold amount of time; and
  wherein the second on-demand RS request is sent only if the second threshold amount of time will be reached, after sending the second on-demand RS request, before the first threshold amount of time will be reached after sending the first on-demand RS request.

27. A non-transitory, processor-readable storage medium comprising processor-readable instructions to cause a processor of a user equipment, in order to request a reference signal, to:
  send a first on-demand reference signal (RS) request for an RS in response to a first positioning request;
  obtain a first timer value indicative of a first threshold amount of time; and
  send a second on-demand RS request in response to receiving, at the user equipment, a second positioning request, having a higher priority than the first positioning request, and in response to determining that the second positioning request was received before the first threshold amount of time has passed after sending the first on-demand RS request.

* * * * *